(12) United States Patent
Takahashi et al.

(10) Patent No.: US 8,207,949 B2
(45) Date of Patent: Jun. 26, 2012

(54) TOUCH PANEL, AND METHOD FOR MANUFACTURING TOUCH PANEL

(75) Inventors: Hirohisa Takahashi, Sammu (JP); Satoru Takasawa, Sammu (JP); Isao Sugiura, Sammu (JP); Atsushi Ota, Sammu (JP); Satoru Ishibashi, Sammu (JP); Haruhiko Yamamoto, Chigasaki (JP)

(73) Assignee: Ulvac, Inc., Chigasaki-shi (JP)

( * ) Notice: Subject to any disclaimer, the term of this patent is extended or adjusted under 35 U.S.C. 154(b) by 321 days.

(21) Appl. No.: 12/567,089

(22) Filed: Sep. 25, 2009

(65) Prior Publication Data

US 2010/0013787 A1    Jan. 21, 2010

Related U.S. Application Data

(63) Continuation of application No. PCT/JP2008/054934, filed on Mar. 18, 2008.

(30) Foreign Application Priority Data

Mar. 26, 2007   (JP) .................................. 2007-078251

(51) Int. Cl.
   *G06F 3/041* (2006.01)
(52) U.S. Cl. ...................... 345/173; 178/18.01; 200/512
(58) Field of Classification Search .......................... None
   See application file for complete search history.

(56) References Cited

U.S. PATENT DOCUMENTS

| | | | |
|---|---|---|---|
| 6,639,163 B2 | 10/2003 | Fukui et al. | |
| 6,896,981 B2 | 5/2005 | Iwabuchi | |
| 2011/0181786 A1* | 7/2011 | Yamazaki et al. | 348/671 |

FOREIGN PATENT DOCUMENTS

| | | |
|---|---|---|
| CN | 302556 A | 4/1997 |
| CN | 1367513 A | 9/2002 |
| JP | 5-241174 | 9/1993 |
| JP | 9-071860 A | 3/1997 |
| JP | 9-150477 A | 6/1997 |
| JP | 9-152940 A | 6/1997 |
| JP | 2002-222055 A | 8/2002 |
| JP | 2003-151366 A1 | 5/2003 |
| JP | 2004-318899 A1 | 11/2004 |
| JP | 2005-141325 A1 | 6/2005 |

OTHER PUBLICATIONS

International Search Report for International Application PCT/JP2008/054934 dated Apr. 8, 2008.

* cited by examiner

*Primary Examiner* — Andrew L Sniezek

(74) *Attorney, Agent, or Firm* — Kratz, Quintos & Hanson, LLP

(57) ABSTRACT

A highly durable touch panel is provided. A touch panel according to the present invention includes a deformable flexible panel, and a transparent electrode film containing $In_2O_3$ as a primary component and containing Ti is exposed to a surface of a lower electrode film of a display device. Since such a transparent electrode film has a high abrasion resistance as compared to a conventional one (such as, an ITO thin film), the transparent electrode film is neither clouded nor cracked even if the lower electrode film is repeatedly pressed. Therefore, the touch panel according to the present invention is highly durable.

7 Claims, 3 Drawing Sheets

US 8,207,949 B2

TOUCH PANEL, AND METHOD FOR MANUFACTURING TOUCH PANEL

The present invention is a Continuation of International Application No. PCT/JP2008/054934 filed Mar. 18, 2008, which claims priority to Japan Patent Document No. 2007-078251, filed on Mar. 26, 2007. The entire disclosures of the prior applications are hereby incorporated by reference herein in their entireties.

TECHNICAL FIELD

The present invention generally relates to the technical field of touch panels.

BACKGROUND ART

Conventionally, touch panels have been widely used in an ATM, a vending machine, a personal digital assistant, a handheld gaming device, an electronic guide display panel, a car navigation system, a mobile phone, or the like.

The touch panel is usually formed by bonding two panels together, on the surfaces of which transparent electrode films (such as, an ITO thin film) is formed with these transparent electrode films facing each other. At least one of the two panels is flexible, and upon pressing this flexible panel, the transparent electrode films are brought into conduction at a pressed location. Such a touch panel includes the so-called matrix touch panel and the so-called resistive touch panel.

In either of the touch panels, the transparent electrode films are brought into conduction by being directly or indirectly contacted to each other. Therefore, if the same location is repeatedly pressed, the transparent electrode film may be clouded or cracked due to the friction. There is a need to address this problem particularly with the transparent electrode of a panel on the side pressed by the flexible panel. See No. JP-A 2003-151366.

DISCLOSURE OF THE INVENTION

Problems to be Solved by the Invention

The present invention has been made to solve the above-described problem. It is an object of the present invention to provide a highly durable touch panel.

Measures to Solve the Problems

In order to solve the above-described problem, the present invention is directed to a touch panel including a display device having a plate-like display panel and a lower electrode film disposed on a surface of the display panel, a flexible panel having a flexible film and an upper electrode film disposed on a surface of the flexible film, and a plurality of spacers arranged on a side of the lower electrode film of the display device, the flexible panel being disposed on the spacers with a side, on which the upper electrode film disposed, facing the lower electrode film, and the touch panel, which is configured so as to bring the lower electrode film and the upper electrode film into conduction when pressing the flexible panel, including a transparent electrode film containing $In_2O_3$ as a primary component and containing Ti in either or both of the upper electrode film and the lower electrode film, wherein the transparent electrode film is exposed to either or both a surface of the upper electrode film and a surface of the lower electrode film.

The present invention is directed toward the touch panel in which the lower electrode film includes an auxiliary electrode film containing ITO; and the auxiliary electrode film is positioned between the transparent electrode film and the display panel.

The present invention is directed toward the touch panel in which the display device includes an antireflection layer; and the antireflection layer is disposed between the display panel and the lower electrode film.

The present invention is directed toward a method for manufacturing a touch panel, in which a first panel is produced by forming a first electrode film having a transparent electrode film exposed onto its surface on a surface of a first substrate, and bonding together the first panel and a second panel having a second electrode film formed on a surface of a second substrate with the first and second electrode films facing each other, and the method for manufacturing the touch panel including a step of forming the transparent electrode film by sputtering a target containing $In_2O_3$ as a primary component and Ti as an additive in a vacuum chamber in which the first substrate is disposed.

The present invention is directed toward the method for manufacturing the touch panel including the steps of forming an auxiliary electrode film on a surface of the first substrate by sputtering a target containing a transparent electrode material of either or both ITO and ZnO as a primary component in the vacuum chamber in which the first substrate is disposed and forming the transparent electrode film on a surface of the auxiliary electrode film, whereby the first electrode is constituted by the auxiliary electrode film and the transparent electrode film.

The present invention is directed toward the method for manufacturing the touch panel including the step of, after the step of forming the auxiliary electrode film, forming the transparent electrode film in the vacuum chamber in which the auxiliary electrode film is formed.

The present invention is directed toward the method for manufacturing the touch panel including the step of passing through a position facing the target containing $In_2O_3$ as a primary component and Ti as an additive multiple times by moving the first substrate in the vacuum chamber, thereby forming the transparent electrode film.

The present invention is directed toward the method for manufacturing the touch panel including the steps of sputtering a first metal target in the vacuum chamber by generating either or both of a plasma of an oxidation gas and a plasma of a nitriding gas, in the vacuum chamber in which the first substrate is disposed, thereby forming a first transparent film on a surface of the first substrate, sputtering a second target containing a different kind of metal from that of the first metal target as a primary component by generating either or both of the plasma of the oxidation gas and the plasma of the nitriding gas in the vacuum chamber in a state that the first substrate is still disposed in the vacuum chamber, thereby forming a second transparent film on a surface of the first transparent film to form an antireflection layer, and sputtering the target containing $In_2O_3$ as a primary component and Ti as an additive in the vacuum chamber in a state such that the first substrate is still disposed in the vacuum chamber, thereby forming the transparent electrode film.

Effect of the Invention

A transparent electrode film containing $In_2O_3$ as a primary component and containing Ti has a high abrasion resistance as compared to the conventional transparent electrode film (such as ITO); and therefore, it is not be damaged even if repeatedly pressed. The transparent electrode film containing $In_2O_3$ as a primary component and containing Ti is not inferior to ITO in the transparency and electrical characteristics. Since this transparent electrode film does not require the surface treatments for reinforcement (such as, formation of a protection film), the transparency and electrical characteristics are not damaged and the manufacturing cost can also be reduced.

BEST MODE FOR CARRYING OUT THE INVENTION

Figure 1:
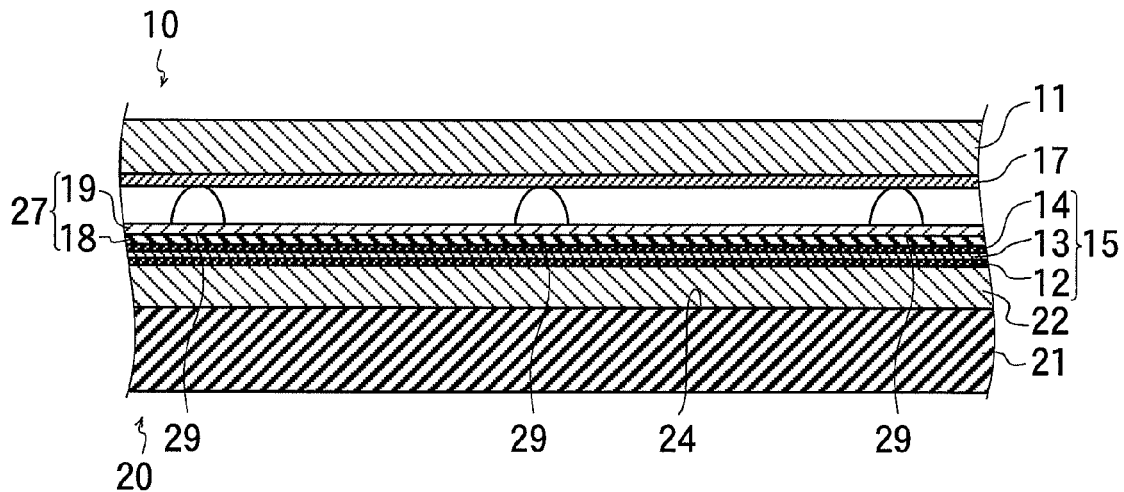
FIG. 1 is a cross section diagram for illustrating a touch panel of a first example of the present invention.

Reference numeral 1 of FIG. 1 represents an example of a touch panel of the present invention; and the touch panel 1 includes a display device 20 and a flexible panel 10.

The display device 20 comprises a plate-like display panel 21 (such as, an LCD or a PDP), and either one of the front surface and rear surface of the display panel 21 is used as a display surface 24 so that image information (such as, graphics or letters) may be displayed on the display surface 24.

An antireflection layer 15 and a lower electrode film 27 are arranged above the display surface 24.

Here, the antireflection layer 15 is formed on the surface of a transparent substrate 22, the lower electrode film 27 is formed on the surface of the antireflection layer 15, and the opposite side surface of the substrate 22 with respect to the antireflection layer 15 is stuck to the display surface 24. The antireflection layer 15 and the lower electrode film 27 are formed in this order above the display surface 24. However, the antireflection layer 15 may be provided directly in the display surface 24. Furthermore, the lower electrode film 27 may be disposed directly in the display surface 24 without providing the antireflection layer 15, or the lower electrode film 27 may be disposed in the surface of the substrate 22.

The flexible panel 10 includes a flexible film 11 (such as, a resin film), and an upper electrode film 17 formed on the surface of the flexible film 11. A plurality of spacers 29 is arranged at intervals in the surface of the display device 20 on the side where the lower electrode film 27 is disposed.

In the flexible panel 10, the surface, in which the upper electrode film 17 is formed, is faced toward the lower electrode film 27 and mounted on the spacer 29; and therefore, the lower electrode film 27 and the upper electrode film 17 face each other and are spaced apart from each other by the height of the spacer 29.

Each of the flexible film 11, the antireflection layer 15, the upper electrode film 17, the lower electrode film 27, and the substrate 22 is transparent, so that the image information displayed in the display surface 24 can be observed from the flexible panel 10 side, as described above.

The antireflection layer 15 comprises, for example, plural laminated layers (here, three layers) of transparent films 12 to 14 each having a different refractive index.

The refractive index and film thickness of each of the transparent films 12 to 14 are designed so that the outside light, such as sunlight or illumination light, may pass through the flexible film 11, and the phase of the interface reflection reflected from the surface of each of the transparent films 12 to 14 may deviate from that of the surface reflection reflected from the surface of the lower electrode film 27; and thus, the surface reflection may attenuate due to the interface reflection. It is therefore possible to clearly observe images display from the display panel 21 of the present invention.

The quality of the material and the film thickness of the upper electrode film 17 are selected so as to be able to deform together with the flexible film 11, so that when the flexible film 11 is bent, the upper electrode film 17 can deform all together and the whole flexible panel 10 can deform.

A user of the touch panel 1 observes the image information of the display panel 21, and selects a position based on this image information and presses the flexible panel 10 at the selected position. In the flexible panel 10, the pressed location is curved; and at this pressed location, the upper electrode film 17 contacts the lower electrode film 27.

The upper electrode film 17 and the lower electrode film 27 are respectively connected to an analyzer. When the touch panel 1 is the resistive touch panel, a pressed position is known from a voltage value of magnitude according to a pressed position; and when it is the matrix touch panel, the pressed position is known from the position of a wiring that comes into conduction by pressing.

A transparent electrode film 19 containing $In_2O_3$ as a primary component and containing Ti is exposed to the surface of the lower electrode film 27. Since the transparent electrode film 19 has both conductivity and transparency and is also excellent in abrasion resistance, as compared to the conventional transparent electrode film containing ITO as a primary component, the lower electrode film 27 is not damaged even if it is repeatedly pressed.

Figure 3:
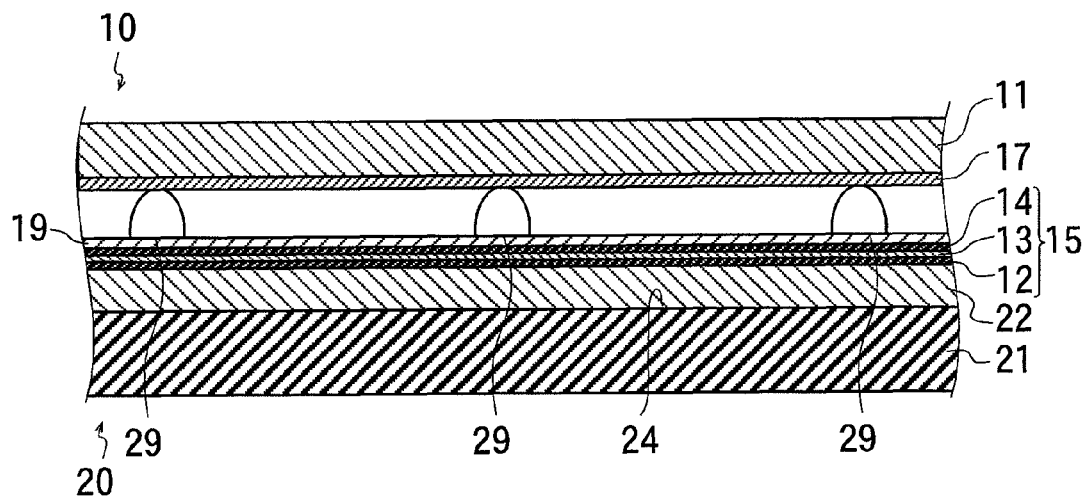
FIG. 3 is a cross section diagram for illustrating a touch panel of a second example of the present invention.

As shown in FIG. 1, in the surface of the transparent electrode film 19 on the display panel 21 side, the lower electrode film 27 may comprise a laminated film having therein other transparent electrode film (e.g., ITO film) disposed as the auxiliary electrode film 18, or as shown in FIG. 3, the lower electrode film 27 may comprise a single layer film of the transparent electrode film 19 containing $In_2O_3$ as a primary component and containing Ti.

The case where the transparent electrode film 19 is provided in the lower electrode film 27 has been described above. However, the present invention is not limited thereto. Reference numerals 81, 82 of FIGS. 5, 6 represent touch panels of third and fourth examples of the present invention, respectively, which will be described with the same members as those of the touch panel 1 of FIG. 1 given the same reference numerals.

Figure 5:
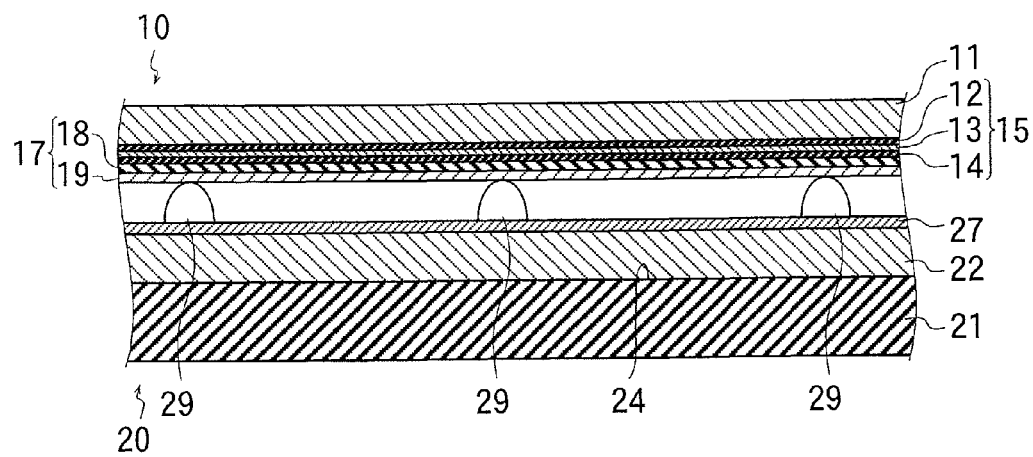
FIG. 5 is a cross section diagram for illustrating a touch panel of a third example of the present invention.
Figure 6:
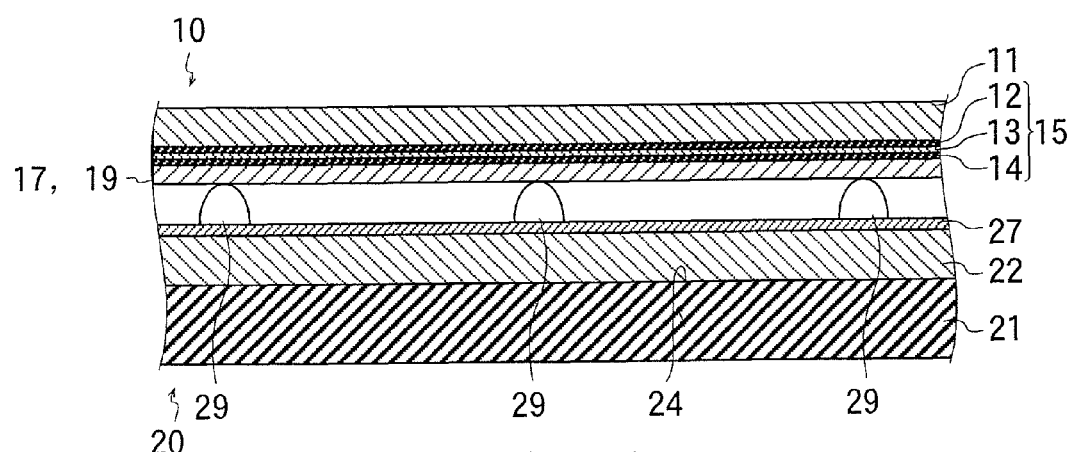
FIG. 6 is a cross section diagram for illustrating a touch panel of a fourth example of the present invention.

In the touch panels 81, 82 of FIGS. 5, 6, the upper electrode film 17 includes the transparent electrode film 19. Here, the antireflection layer 15 is disposed between the upper electrode film 17 and the flexible film 11. However, the upper electrode film 17 may be disposed directly in the surface of the flexible film 11 without providing the antireflection layer 15.

In the touch panel 81 of FIG. 5, the upper electrode film 17 comprises the auxiliary electrode film 18 in addition to the transparent electrode film 19, while in the touch panel 82 of FIG. 6, the upper electrode film 17 comprises the transparent electrode film 19. In either case, the transparent electrode film 19 is exposed to the surface of the upper electrode film 17, so that the upper electrode film 17 may not be damaged even if the upper electrode film 17 is repeatedly pushed against the lower electrode film 27.

The transparent electrode film 19 may be disposed so as to be exposed not only to either one but to both of the surfaces of the upper electrode film 17 and the lower electrode film 27.

Although either one or both of the upper electrode film 17 and the lower electrode film 27 may comprise a transparent electrode film containing $In_2O_3$ as a primary component and containing Ti, such a transparent electrode film has a high electric resistance as compared to ITO or ZnO.

Accordingly, for the upper electrode film 17 or/and the lower electrode film 27, a two-layer structure of an auxiliary electrode film containing as a primary component a transparent conductive material comprising either or both of ITO and ZnO and a transparent electrode film containing $In_2O_3$ as a primary component and containing Ti can reduce in its entirety the electric resistance.

Next, a manufacturing process of the touch panel 1 will be described.

Figure 2:
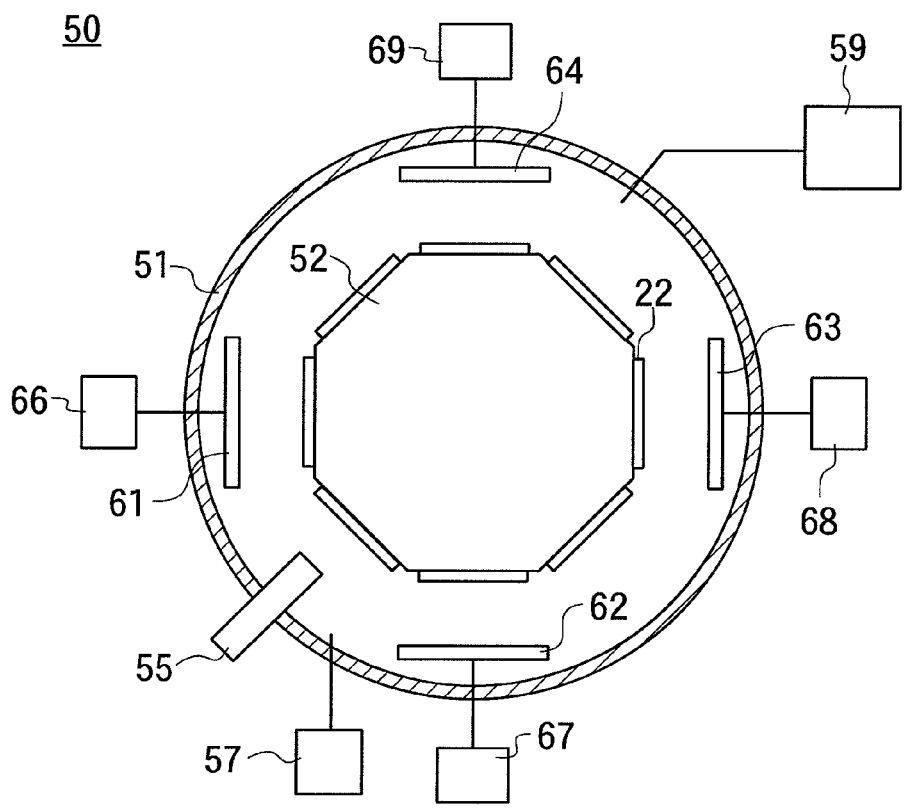
FIG. 2 is a cross section diagram for illustrating the manufacturing apparatus used in the present invention.

Reference numeral 50 of FIG. 2 represents manufacturing apparatus used in the manufacture of the above-described display device 20 or flexible panel 10 of the touch panel 1.

The manufacturing apparatus 50 includes a vacuum chamber 51 and a substrate holder 52 disposed in the vacuum chamber 51.

Here, the substrate holder 52 is columnar and connected to a non-illustrated rotator, and is configured to rotate about the center axis upon transmission of a driving force of the rotator.

The substrate holder 52 can hold one, or two or more objects to be processed on a lateral side face thereof; and when the substrate holder 52 rotates, each of the objects to be processed also rotate all together and the objects move on the circumference around the center axis of the substrate holder 52.

Around the substrate holder 52, a plurality of targets 61 to 64 and an ion gun 55 are arranged along the rotation direction of the substrate holder 52; and when the substrate holder 52 rotates, each of the objects sequentially pass through a position facing each of the targets 61 to 64 and a position facing the ion gun 55.

The respective targets 61 to 64 are connected to power sources 66 to 69, respectively. A vacuum evacuation system 59 and a gas supply system 57 are connected to the vacuum chamber 51. Upon the application of a voltage to each of the targets 61 to 64 while evacuating the interior of the vacuum chamber 51 by the vacuum evacuation system 59 and supplying a sputtering gas from the gas supply system 57, the surfaces of the targets 61 to 64 are sputtered and the sputtered particles are emitted. When an object to be processed passes through the position facing each of the targets 61 to 64, the sputtered particles reach the surface of the object.

In the ion gun 55, an emitting opening for emitting an ion beam is faced toward the lateral side of the substrate holder 52. Upon the emission of an ion beam from the ion gun 55 while evacuating the interior of the vacuum chamber 51 and supplying a reactive gas from the gas supply system 57, the plasma of the reactive gas generates and the object is exposed to the plasma of the reactive gas when passing through the position facing the emitting opening.

When the sputtering of the targets 61 to 64, the generation of the plasma of the reactive gas, and the rotation of the substrate holder 52 are performed at the same time, the sputtered particles reach the surface of the object to be processed and an atomic layer is formed. This atomic layer is exposed to the plasma of the reactive gas and a thin film of a reaction product of the atomic layer and the reactive gas is formed (meta-mode).

If the step of forming the atomic layer and the step of exposing the atomic layer to the plasma are alternately repeated multiple times by rotating the substrate holder 52 while continuing the sputtering of the targets 61 to 64 and the generation of the plasma of the reactive gas, then the reaction product grows.

If the substrate holder 52 is rotated at a high speed so that several sputtered particles may be stacked per one rotation, a thin atomic layer is exposed to the plasma of the reactive gas. Therefore, the reaction of the atomic layer is fast and the film formation rate is high as compared to that of the conventional sputtering apparatus.

Moreover, film formation can also be performed to an object to be processed (such as, a resin film) because the object is not exposed to heat from the targets 61 to 64 for a long time as compared to the case where film formation is performed while keeping the object stationary.

Next, steps of manufacturing the touch panel 1 using the manufacturing apparatus 50 will be described.

After a vacuum atmosphere is formed by the evacuation of the interior of the vacuum chamber 51, the substrate 22 (first substrate) as an object to be processed is carried in the vacuum chamber 51 and held by the substrate holder 52 while maintaining this vacuum atmosphere. FIG. 2 shows a state where a plurality of substrates 22 is attached to the substrate holder 52.

As the targets 61 to 64, different kinds of metal targets 61, 62, a transparent conductive material target 63 containing $In_2O_3$ as a primary component and Ti as an additive, and another transparent conductive material target 64 containing ITO as a primary component are arranged in advance. The metal targets 61, 62 are targets each containing a metal as a primary component (including silicon).

If a sputtering gas (such as, Ar or Kr), and an oxidation gas (reactive gas) containing an oxygen atom in the chemical structure are supplied from the gas supply system 57 while continuing the evacuation, and the first metal target 61 is sputtered by generating the plasma of the oxidation gas while rotating the substrate holder 52, then after a metal atomic layer is formed in the surface of the substrate 22, this atomic layer reacts with the plasma of oxidation gas and a film (transparent film 12) of a reaction product is formed.

If rotation of the substrate holder 52 is continued while continuing the generation of the plasma of the oxidation gas and the sputtering of the metal target 61, then the substrate 22 alternately passes through the position facing the metal target 61 and the position where it is exposed to the plasma of the oxidation gas multiple times.

The step of forming the metal atomic layer and the step (oxidization step) in which the atomic layer reacts with the plasma of the oxidizing gas are alternately performed multiple times onto the surface of the substrate 22. As a result, the transparent film 12 grows.

When the transparent film 12 reaches a predetermined film thickness, the above-described sputtering of the metal target 61 is stopped. Then, other metal target 62 containing as a primary component a different kind of metal from that of the metal target 61 is sputtered in order to form one or more layers of transparent films 13, 14 of different kinds onto the surface of the previously formed transparent film 12, thereby forming the antireflection layer 15 comprising a laminated film of the transparent films 12 to 14 in the surface of the substrate 22.

The auxiliary electrode film 18 is formed by sputtering the target 63 containing ITO as a primary component while continuing the evacuation and the supply of the oxidation gas and sputtering gas in a state such that the sputtering of the metal targets 61, 62 is stopped and the ion gun 55 is stopped.

If the substrate 22 is moved in the vacuum chamber 51 to pass through the position facing the target 63 multiple times by the rotation of the substrate holder 52 while sputtering the target 63, then the auxiliary electrode film 18 grows.

If the auxiliary electrode film 18 grows to a predetermined film thickness, the sputtering of the target 63 is stopped, and the transparent electrode film 19 is formed with the substrate 22 being disposed in the vacuum chamber 51. For the transparent electrode film 19, for example, while continuing the evacuation and the supply of the oxidation gas and sputtering gas after stopping the ion gun 55, the target 64 containing $In_2O_3$ as a primary component and Ti as an additive is sputtered.

The transparent electrode film 19 containing $In_2O_3$ as a primary component and Ti as an additive is formed in the surface of the auxiliary electrode film 18.

If the substrate 22 is moved in the vacuum chamber 51 to pass through the position facing the target 64 multiple times by the rotation of the substrate holder 52 while sputtering the target 64, the transparent electrode film 19 grows.

If the transparent electrode film 19 grows to a predetermined film thickness and the lower electrode film 27 including the transparent electrode film 19 and the auxiliary electrode film 18 is formed, then the substrate 22 is removed from the vacuum chamber 51. If the substrate 22 having the lower electrode film 27 formed therein is stuck to the display panel 21, the display device 20 (first panel) can be obtained.

It is also possible that in place of the substrate 22, the transparent substrate of the display panel 21 is used as the object to be processed, and the antireflection layer 15 and the lower electrode film 27 are formed directly in the transparent substrate, followed by the assembling of the display panel 21 in order to produce the display device 20 having the antireflection layer 15 (or lower electrode film 27) formed directly in the display surface 24.

If a second panel (flexible panel 10), in which a second electrode (upper electrode film 17) is formed on a surface of a second substrate (flexible film 11), is prepared, and the display device 20 and the flexible panel 10 are bonded together so that the upper electrode film 17 and the lower electrode film 27 may face each other with the spacer 29 interposed there between, then the touch panel 1 can be obtained.

The case where the substrate 22 is used as the first substrate and the transparent electrode film 19 is formed on the surface of the substrate 22 has been described above. However, the present invention is not limited thereto. The flexible panel 10 as shown in FIGS. 5, 6 may be produced as the first panel by using the flexible film 11 as the first substrate and forming the transparent electrode film 19 on the surface of the flexible film 11.

Furthermore, the transparent electrode film 19 may be formed on both surfaces of the first and second substrates (substrate 22 and flexible film 11).

The oxidation gas is not limited in particular as long as the gas contains an oxygen atom in the chemical structure, and, for example, $O_2$, $O_3$, and $H_2O$ may be used singly or two or more thereof may be used in combination.

The reactive gas used in forming the transparent films 12 to 14 is not limited to the oxidation gas, but a nitriding gas containing a nitrogen atom in the chemical structure may be used. As the nitriding gas, either one or both $N_2$ and $NH_3$ can be used.

For example, the primary component of the transparent films 12 to 14 is $SiO_2$ when the metal target is a Si target and the reactive gas is an oxidation gas, and it is SiN when the reactive gas is a nitriding gas. Moreover, it is ZrO when the metal target is a Zr target and the reactive gas is an oxidation gas, and it is ZrN when the reactive gas is a nitriding gas. $SiO_2$, SiN, ZrO, and ZrN have different refractive indexes.

Furthermore, the transparent films 12 to 14 having different refractive indexes may be stacked by changing the kind of reactive gas without changing the kinds of metal targets 61, 62.

The kinds of metal targets 61, 62 are not limited to Si and Zr. The metal target containing as a primary component at least one kind of metallic material selected from the group consisting of Si, Zr, Ti, Sb, Zn, Nb, and Ta may be used, and the transparent films 12 to 14 comprising nitrides or oxides of these metals may be formed.

The targets 63, 64 of the transparent conductive material are not particularly limited. For example, in forming the auxiliary electrode film 18, the target 64 containing, as a primary component, a transparent conductive material comprising either one or both ITO and ZnO can be used.

The order of sputtering the transparent conductive material targets 63, 64 and the kinds thereof are not particularly limited. However, the target 64, containing $In_2O_3$ as a primary component and Ti as an additive, is finally sputtered so that the transparent electrode film 19, containing $In_2O_3$ as a primary component and Ti as an additive, is exposed to the surface of the flexible panel 10.

The content of Ti in the target 63 is not particularly limited. However, the target 63 containing Ti with 0.1 atom % or more and 30 atom % or less is used; and the transparent electrode film 19 containing $In_2O_3$ as a primary component and containing Ti with 0.1 atom % or more and 30 atom % or less is preferably formed.

If all the steps from the step of forming the transparent films 12 to 14 through the step of forming the transparent electrode film 19 are continuously performed in the same vacuum chamber 51 without removing the substrate 22 from the vacuum chamber 51, then neither the antireflection layer 15 nor the electrode film is contaminated.

The case where the transparent films 12 to 14, the transparent electrode film 19, and the auxiliary electrode film 18 are formed by the sputtering method has been described above, but the present invention is not limited thereto.

At least one of the transparent films 12 to 14, the transparent electrode film 19, and the auxiliary electrode films 18 can be deposited by the evaporation. As the evaporation method, activated reactive evaporation (ARE) is particularly preferable, in which an evaporation gas is supplied into a vacuum chamber and a deposition material is deposited by being evaporated while this evaporation gas is activated.

Only a rare gas (such as, Ar or Kr), or both a rare gas and a reactive gas can be used as the evaporation gas, and either one or both of the above-described oxidation gas and nitriding gas can be used as the reactive gas.

Moreover, the transparent electrode film containing $In_2O_3$ as a primary component and containing Ti may be exposed not only to the surface of the upper electrode film 17 but to the surface of the lower electrode film 27; and in this case, the touch panel 1 exhibits higher durability.

EXAMPLES

Example 1

A Si target, a Zr target, and a Si target were sputtered in this order, and a $SiO_2$ film, a ZrO film, and a $SiO_2$ film were stacked in this order onto the surface of the substrate 22 of a resin film, thereby forming the antireflection layer 15.

Next, an ITO target containing $In_2O_3$ as a primary component and having 10% by weight of $SnO_2$ added thereto and a target containing $In_2O_3$ as a primary component and having 1% by weight of $TiO_2$ added thereto were sputtered in this order, and the auxiliary electrode film 18 containing ITO as a primary component and the transparent electrode film 19 (1 nm in film thickness) containing $In_2O_3$ as a primary component and having Ti added thereto were then stacked in order to form the lower electrode film 27, thereby producing a display panel 21.

The upper electrode film 17 of an ITO thin film was formed in the surface of the flexible film 11 of a resin film, thereby producing the flexible panel 10. The flexible panel 10 and the display panel 21 were bonded together with the upper electrode film 17 and the lower electrode film 27 facing each other and with a double-sided tape interposed there between, thereby producing a test panel of Example 1.

Examples 2, 3

Test panels of Examples 2, 3 were produced under the same conditions as those of Example 1, except that the film thickness of the transparent electrode film 19 was changed to 5 nm and 10 nm, respectively.

Embodiment 4

A test panel of Example 4 was produced under the same conditions as those of Example 1, except that the lower electrode film 27 was formed from a single layer of the transparent electrode film 19 without forming the auxiliary electrode film 18.

Comparative Example 1

A test panel of Comparative Example 1 was produced under the same conditions as those of Example 1, except that the lower electrode film 27 was formed from only the auxiliary electrode film 18 without forming the transparent electrode film 19.

Sliding characteristic tests shown below were conducted using the test panels of Examples 1 to 4 and Comparative Example 1 described above.

Sliding Characteristic Test

Figure 4:
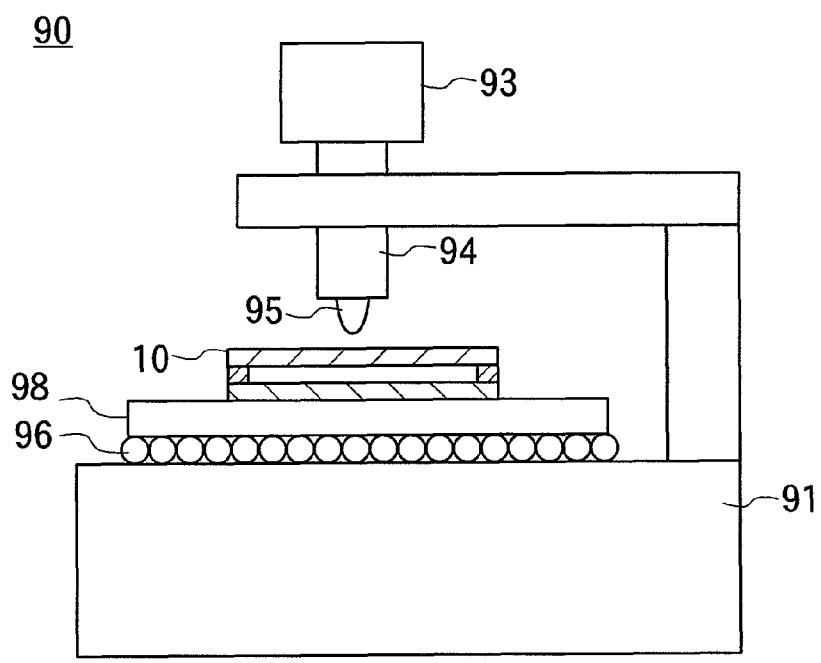
FIG. 4 is a schematic cross section diagram for illustrating a sliding test machine.

Reference numeral 90 of FIG. 4 represents a sliding test machine. The sliding test machine 90 includes a base 91. Ball bearings 96 are arranged on the base 91. A stage 98 is placed on the ball bearings 96.

The test panels of Examples 1 to 4 and Comparative Example 1 are placed on the stage 98 with the flexible panel 10 facing upward.

An oscillator tip portion 95 made of resin was attached to a lower end of an oscillator 94 above the stage 98. Furthermore, a load 93 was attached to an upper end of the oscillator 94 so that a sum of the weights of the oscillator 94, the oscillator tip portion 95, and the load 93 became 250 gf, 500 gf, and 1000 gf, respectively. The oscillator 94 was reciprocated 300,000 times with the load of 250 gf, 60,000 times and 100,000 times with the load of 500 gf, and 50,000 times with the load of 1,000 gf, respectively, while pressing the flexible panel 10 with the oscillator tip portion 95.

With regards to the test panel after the reciprocation movement, the one having no flaw seen in the surface of the lower electrode film 27 was evaluated and marked as a circle, the one having a partial flaw seen therein was evaluated and marked as a triangular, and the one having flaws seen across the slid portion was evaluated and marked as an x. The evaluation results are listed in Table 1 below.

TABLE 1

Table 1 Evaluation Results of Sliding Characteristic Test

| | | Measurement results of sliding test | | | | |
|---|---|---|---|---|---|---|
| Load (gf) | Number of sliding reciprocations | Comparative example 1 Auxiliary electrode film | Example 1 Auxiliary electrode film + Transparent electrode film (1 nm) | Example 2 Auxiliary electrode film + Transparent electrode film (5 nm) | Example 3 Auxiliary electrode film + Transparent electrode film (10 nm) | Example 4 Transparent electrode film |
| 250 | 300,000 | X | ○ | ○ | ○ | ○ |
| 500 | 60,000 | Δ | ○ | ○ | ○ | ○ |
| 500 | 100,000 | X | ○ | ○ | ○ | ○ |
| 1000 | 50,000 | X | ○ | ○ | ○ | ○ |

Note 1.
Auxiliary electrode film: ITO

Note 2.
Transparent electrode film: containing $In_2O_3$ as a primary component and containing Ti (Number inside parenthesis represents film thickness)

As apparent from Table 1 above, in Examples 1 to 4, in which the transparent electrode film 19 containing $In_2O_3$ as a primary component and Ti as an additive is formed in the surface of the lower electrode film 27, no flaw was seen under all the sliding conditions even if the film thickness was varied. As apparent from the above, no limitation in the film thickness or the like is set for the transparent electrode film 19 that is exposed to the surface.

What is claimed is:

1. A touch panel including a display device having a plate-like display panel and a lower electrode film disposed on a surface of the display panel, a flexible panel having a flexible film and an upper electrode film disposed on a surface of the flexible film, and a plurality of spacers arranged on a side of the lower electrode film of the display device, the flexible panel being disposed on the spacers with a side, on which the upper electrode film is disposed, facing the, lower electrode film, the touch panel, which is configured so as to bring the lower electrode film and the upper electrode film into conduction when pressing the flexible panel, comprising:
a transparent electrode film containing $In_2O_3$ as a primary component and containing Ti with at least 0.1 atom % and at most 30 atom % in at least one of the upper electrode film and the lower electrode film; and
an auxiliary electrode film containing ITO in contact with a rear surface of the transparent electrode film, wherein the transparent electrode film is exposed to at least one of a surface of the upper electrode film and a surface of the lower electrode film.

2. The touch panel according to claim 1, wherein a film thickness of the transparent electrode film is at least 1 nm and at most 10 nm.

3. The touch panel according to claim 1, wherein the display device includes an antireflection layer, and wherein the antireflection layer is disposed between the display panel and the lower electrode film.

4. A method for manufacturing a touch panel, in which a first panel is produced by forming a first electrode film having a transparent electrode film exposed onto its surface on a surface of a first substrate, and bonding together the first panel and a second panel having a second electrode film formed on a surface of a second substrate with the first and second electrode films facing each other, the method for manufacturing the touch panel, comprising the steps of:
forming an auxiliary electrode film on a surface of the first substrate by sputtering a target containing a transparent electrode material of at least one of ITO and ZnO as a primary component in a vacuum chamber in which the first substrate is disposed; and
forming the transparent electrode film on a surface of the auxiliary electrode film by sputtering a target containing $In_2O_3$ as a primary component and containing Ti with at least 0.1 atom % and at most 30 atom % in the vacuum chamber in which the first substrate is disposed.

5. The method for manufacturing a touch panel according to claim 4, further comprising the step of after the step of forming the auxiliary electrode film, forming the transparent electrode film in the vacuum chamber in which the auxiliary electrode film is formed.

6. The method for manufacturing a touch panel according to claim 4, further comprising, the step of:
passing through a position facing the target containing $In_2O_3$ as a primary component and Ti as an additive multiple times by moving the first substrate in the vacuum chamber, thereby forming the transparent electrode film.

7. A method for manufacturing a touch panel, in which a first panel is produced by forming a first electrode film having a transparent electrode film exposed onto its surface on a surface of a first substrate, and bonding together the first panel and a second panel having a second electrode film formed on a surface of a second substrate with the first and second electrode films facing each other, the method for manufacturing a touch panel further comprising the steps of:
sputtering a first metal target in a vacuum chamber by generating at least one of a plasma of an oxidation gas and a plasma of a nitriding gas, in the vacuum chamber in which the first substrate is disposed, thereby forming a first transparent film on a surface of the first substrate;
sputtering a second target containing a different kind of metal from that of the first metal target as a primary component by generating at least one of the plasma of the oxidation gas and the plasma of the nitriding gas in the vacuum chamber in a state such that the first substrate is still disposed in the vacuum chamber, thereby forming a second transparent film on a surface of the first transparent film to form an antireflection layer; and
sputtering a target containing $In_2O_3$ as a primary component and Ti as an additive in the vacuum chamber in a state such that the first substrate is still disposed in the vacuum chamber, thereby forming the transparent electrode film.

* * * * *